(12) United States Patent
Watkins et al.

(10) Patent No.: US 6,795,801 B1
(45) Date of Patent: Sep. 21, 2004

(54) APPARATUS AND METHOD FOR ANALYZING ANISOTROPIC PARTICLE SCATTERING IN THREE-DIMENSIONAL GEOMETRIES

(75) Inventors: Kenneth E. Watkins, San Jose, CA (US); Dean B. Jones, San Jose, CA (US); Kathleen S. Ramp, Morgan Hill, CA (US)

(73) Assignee: Electric Power Research Institute, Inc., Palo Alto, CA (US)

( * ) Notice: Subject to any disclaimer, the term of this patent is extended or adjusted under 35 U.S.C. 154(b) by 762 days.

(21) Appl. No.: 09/632,510

(22) Filed: Aug. 4, 2000

Related U.S. Application Data

(60) Provisional application No. 60/148,840, filed on Aug. 13, 1999.

(51) Int. Cl.[7] ................................................. G06G 7/48
(52) U.S. Cl. ................... 703/6; 703/1; 703/2; 700/286; 376/207; 376/245
(58) Field of Search ...................... 703/1–2, 6; 700/286; 376/207, 245

(56) References Cited

U.S. PATENT DOCUMENTS 5,267,276 A * 11/1993 Vujic ......................... 376/215

OTHER PUBLICATIONS

Bossen, "Anisotropic Mesh Generation with Particles," Carnegie Mellon University, School of Computer Science, pp. 1–59 (May 1996)(paper available at: http://citeseer.nj.nec.com/bossen96anisotropic.html).*

Shimada et al, "Anisotropic Triangular Meshing of Parametric Surfaces via Close Packing of Ellipsoidal Bubbles," pp. 1–16 (1996)(paper available at: http://citeseer.nj.nec.com/shimada96anisotropic.html).*

Schmid, "Multigrid Eigenvalue Methods for the Neutron Multigroup Diffusion Equations," Technische Universität München, pp. 1–22 (Apr. 1994)(paper available at: http://citeseer.nj.nec.com/schmid94multigrid.html).*

* cited by examiner

Primary Examiner—Samuel Broda, Esq.
(74) Attorney, Agent, or Firm—Morgan, Lewis & Bockius LLP

(57) ABSTRACT

The disclosed method, a technique for analyzing anisotropic particle scattering, includes the step of establishing a three-dimensional geometric representation of an object. A set of rays is then projected through the three-dimensional geometric representation to produce simulated anisotropic particle scattering. An integral particle transport analysis is then executed on the simulated anisotropic particle scattering to produce particle transport data. The disclosed apparatus, a computer readable memory to direct a computer to function in a specified manner, includes a computer aided design system to establish a three-dimensional geometric representation of an object. The computer aided design system includes a line-of-sight analysis feature to project a set of rays through the three-dimensional geometric representation to produce simulated anisotropic particle scattering. A particle transport analysis program executes an integral particle transport analysis on the simulated anisotropic particle scattering to produce particle transport data.

20 Claims, 10 Drawing Sheets

Parts List

| Volume ID | Material ID | ii | jj | tt | k | n |
|---|---|---|---|---|---|---|
| CORNOD_NjjEii:k.1 | CORNOD_NijEiiZk.1 | 13 | 1 | - | 1-25 | - |
| | | 13 | 2 | - | 1-25 | - |
| | | 13 | 3 | - | 1-25 | - |
| | | 13 | 4 | - | 1-25 | - |
| | | 12-13 | 5 | - | 1-25 | - |
| | | 11-12 | 6 | - | 1-25 | - |
| | | 11 | 7 | - | 1-25 | - |
| | | 11 | 8 | - | 1-25 | - |
| | | 10-11 | 9 | - | 1-25 | - |
| | | 10 | 10 | - | 1-25 | - |
| CORNOD_BULK:k.1 | CORNOD_BULKZk.1 | - | - | - | 1-25 | - |

*FIG. 11*

APPARATUS AND METHOD FOR ANALYZING ANISOTROPIC PARTICLE SCATTERING IN THREE-DIMENSIONAL GEOMETRIES

This application claims priority to provisional patent application Ser. No. 60/148,840, filed Aug. 13, 1999.

BRIEF DESCRIPTION OF THE INVENTION

This invention relates generally to the analysis of particle densities in three-dimensional objects. More particularly, this invention relates to a technique for analyzing anisotropic particle scattering in three-dimensional objects.

BACKGROUND OF THE INVENTION

It is frequently desirable to determine the magnitude of neutrally-charged particle densities, especially nuclear particles, such as neutron, gamma-ray, and X-ray particle densities, in regions where the densities exhibit a significant spatial gradient. Such conditions will exist wherever the particles are "streaming" from regions of high density, such as in or near the particle source, into regions of lower particle density. An accurate determination of the particle concentrations under these conditions has utility for a variety of radiation monitoring and design applications, including the determination of radiation levels and particle irradiation effects in regions outside the active core of nuclear reactors. Particle concentration information is also important for the design and evaluation of radiation shielding and radiation material shipping and handling devices. Particle density information is also critical while evaluating irradiation effects on biological bodies resulting from man-made and natural radiation sources.

In order to accurately determine the magnitude of neutrally-charged particle densities in applications characterized by significant spatial gradients, it is necessary to consider angular variations in particle scattering in order to determine the preferred directions of particle motion. Evaluations that preserve the angular dependence of particle scattering interactions utilize "anisotropic scattering" considerations, as opposed to "isotropic scattering" evaluations, wherein particle scattering is assumed to be equally likely in any direction with no preferential directions of particle motion.

Two general approaches may be utilized to characterize the transport of neutrally-charged particles: stochastic methods and deterministic methods. Traditional implementations of each approach have demonstrated disadvantages when applied to the evaluation of particle transport in realistic three-dimensional applications.

Stochastic evaluations, such as Monte Carlo techniques, are based upon an assessment of the probabilistic nature of particle interactions. Arbitrary geometry techniques have been utilized to permit the representation of complex bodies in three-dimensional space. However, stochastic methods suffer from the necessity of tracking an inordinately large number of particle interactions in order to characterize highly anisotropic particle fields, such as those present outside reactor cores, with any reasonable degree of accuracy. Even with the current generation of computing systems, this limitation restricts the practical application of stochastic techniques to applications involving small spatial gradients and, generally, relatively small spatial geometries.

The limitations of stochastic techniques has led to increased reliance upon deterministic methods in the evaluation of particle transport in large geometry systems. The most accurate deterministic methods rely upon simplified formulations of the integro-differential Boltzmann particle transport equation.

A preferred implementation of the Boltzmann equation that achieves accurate results while providing a high degree of flexibility in modeling complex geometries is the integral transport formulation. This formulation is utilized for collision probability methodologies and characteristic solution methodologies that are frequently the basis of current nuclear core evaluation tools. Unfortunately, traditional formulations of the integral transport methodology do not preserve the angular dependence of particle motion, thus limiting the use of integral transport methods to applications that are characterized by little or no anisotropic scattering effects.

Differential formulations of the Boltzmann equation that preserve angular particle scattering effects have been developed as an alternative to the integral transport methods. Unfortunately, differential formulations suffer from being restricted to fairly regular geometric representations and require fine solution meshing if reasonable accuracy is to be maintained.

In view of the foregoing, it would be highly desirable to provide an accurate particle transport evaluation system that is capable of accurate evaluations in large, complex three-dimensional geometries involving significant anisotropic scattering effects.

SUMMARY OF THE INVENTION

The method of the invention is a technique for analyzing anisotropic particle scattering. The method includes the step of establishing a three-dimensional geometric representation of an object. A set of rays is then projected through the three-dimensional geometric representation to produce simulated anisotropic particle scattering. An integral particle transport analysis is then executed on the simulated anisotropic particle scattering to produce particle transport data.

The apparatus of the invention is a computer readable memory to direct a computer to function in a specified manner. The apparatus includes a computer aided design system to establish a three-dimensional geometric representation of an object. The computer aided design system includes a line-of-sight analysis feature to project a set of rays through the three-dimensional geometric representation to produce simulated anisotropic particle scattering. A particle transport analysis program executes an integral particle transport analysis on the simulated anisotropic particle scattering to produce particle transport data.

The invention utilizes a unique formulation of the Boltzmann particle transport equation to provide deterministic integral transport methodology that preserves the angular dependence of particle interactions and particle motion. The invention is especially suited for use in determining neutron, gamma, and X-ray radiation field intensities, and particle distributions in nuclear reactor systems, and in the evaluation of irradiation effects on other bodies of irregular shape. Application of the invention's CAD geometrical modeling system to the deterministic transport methodology results in an integrated solution system that eliminates restrictions imposed by classical mesh-dependent solution methodologies.

BRIEF DESCRIPTION OF THE DRAWINGS

For a better understanding of the invention, reference should be made to the following detailed description taken in conjunction with the accompanying drawings, in which:

FIG. 11 is a list of reactor core region volume and material identifiers processed in accordance with an embodiment of the invention.

Like reference numerals refer to corresponding parts throughout the drawings.

DETAILED DESCRIPTION OF THE INVENTION

Figure 1:
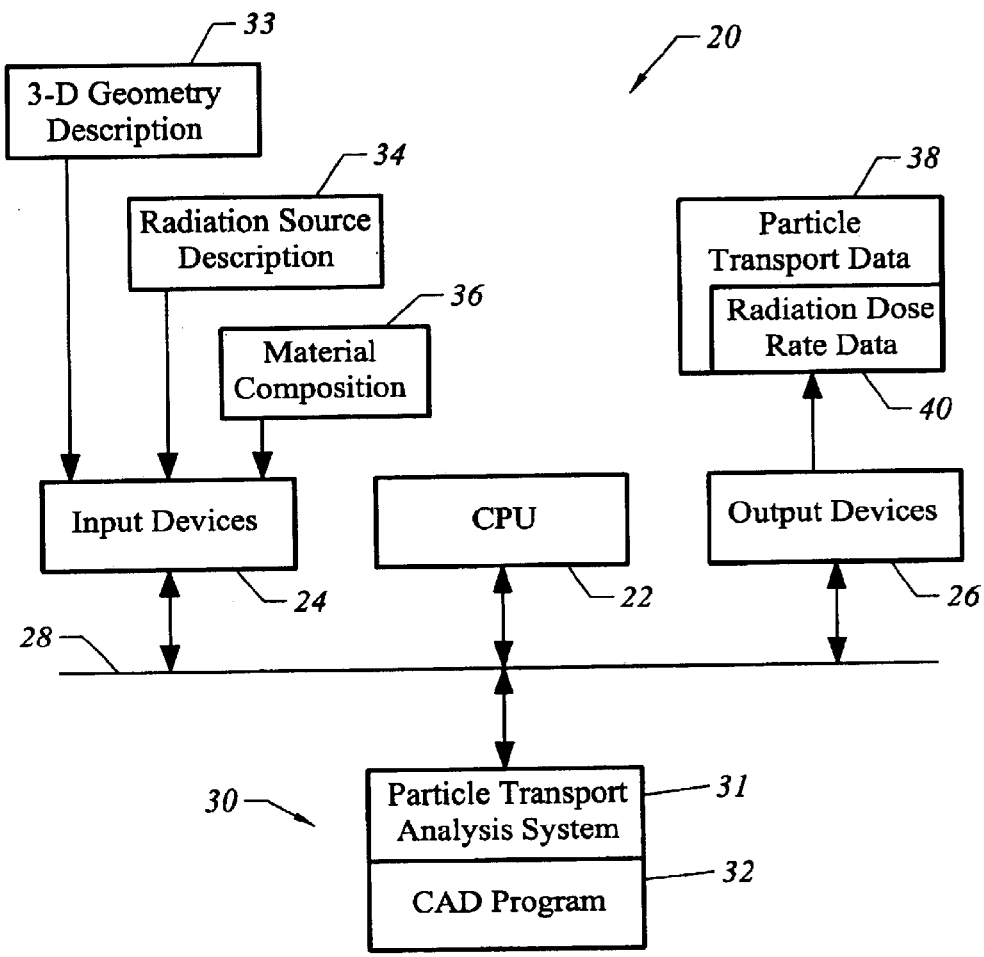
FIG. 1 illustrates a particle transport analysis apparatus constructed in accordance with an embodiment of the invention.

FIG. 1 illustrates a particle transport analysis apparatus 20 constructed in accordance with an embodiment of the invention. The apparatus 20 has standard computer components including a central processing unit (CPU) 22, one or more input devices 24 (e.g., a keyboard, mouse, and the like), and one or more output devices 26 (e.g., a video display terminal, a printer, and the like). The CPU 22 communicates with the input devices 24 and output devices 26 via a system bus 28. The system bus 28 is also used to establish interaction with a computer memory 30. The computer memory 30 stores a particle transport analysis program 31, which has an associated computer aided design (CAD) program 32. The particle transport analysis program 31 is a computer program that executes particle transport analysis functions of the type described below.

The particle transport analysis program 31 processes information received from the input devices 24. Namely, the particle transport analysis program 31 processes a three-dimensional geometry description 33, a radiation source description 34, and a material composition description 36. This input data is processed to produce particle transport data 38, which may include radiation dose rate data 40.

The particle transport analysis program 31 utilizes unique formulations of the Boltzmann particle transport equation. Each formulation has been specifically established to provide a deterministic integral transport implementation that allows an explicit treatment of anisotropic scattering in three-dimensional geometry.

One formulation of the Boltzmann equation that is suited for problems of small to intermediate size (i.e., typically no more than a few hundred solution regions) utilizes a methodology that is analogous to collision probability formulations, except that the angular dependence essential for anisotropic scattering treatment is preserved in the formulation. The formulation consists of transforming the Boltzmann equation from a form that conserves the angular flux of the particles to one that conserves the angular scattering density. This transformation casts the integro-differential Boltzmann equation into a volume integral form that can be solved using techniques similar to those employed by collision probability based solution methodologies that are adjusted to retain the angular dependence of the particles. The angular scattering density is formed by multiplying the Boltzmann equation by the angular and energy dependent particle scattering cross-section and integrating the resulting equation over all energy groups and scattering angles.

Another formulation of the Boltzmann equation that is suited to problems with a large number of solution regions (i.e., greater than a few hundred solution regions) has been developed utilizing an implementation that is similar to a characteristic solution methodology which preserves the angular dependence of the Boltzmann equation in three-dimensional geometry. This formulation consists of performing an integration of the Boltzmann equation along the characteristic curves of the equation. Three dimensional characteristics are utilized and explicit anisotropic representation of the material cross-sections is maintained throughout the solution.

The solution of both formulations of the Boltzmann equation requires passing a large number of parallel rays through the geometry being solved. In accordance with the invention, a geometry is modeled using the computer aided design program 32. Thereafter, a line-of-sight analysis feature of the computer aided design program 32 is used to generate the parallel rays.

A number of discrete angular directions are chosen to fully represent the angular dependence of the particles. The geometry may be cast in either two dimensions or in three dimensions, with the ray generation being adjusted accordingly to fully saturate the modeled geometry. Individual parts of the geometry are sub-meshed to form suitable sized solution volumes. The points of intersection of the various rays with the surface of each sub-volume are identified. These intersections, along with the angular scattering relationship specified by the angular scattering equation, are used to determined particle interactions throughout the modeled geometry.

As indicated above, the overall geometry, including solution sub-volume meshing, is represented using a Computer Aided Design (CAD) system 32, which forms a portion of or is otherwise associated with the particle transport analysis program 31. The use of the CAD system 32 permits detailed descriptions of highly complex non-uniform geometric shapes. In addition, the CAD system 32 incorporates ray tracing features that are traditionally used to perform various line-of-sight interaction evaluations. The ray tracing feature of the CAD system 32 is suitably adjusted to identify the intersections of each solution sub-volume along each ray that traverses the geometry. Use of the CAD-based ray tracing features permits detailed solutions in geometries that are not easily represented in discrete mathematical form.

The invention is more fully appreciated in connection with a specific example. The following discussion assumes a power plant with a General Electric Boiling Water Reactor Model 4 (BWR/4) nuclear reactor assembly. The core rgion of the reactor assembly has 560 fuel assemblies that generate a rated thermal energy output of 2436 megawatts. Several design parameters are listed in the following table.

TABLE I

| Reactor Type | General Electric Model BWR/4 | |
| --- | --- | --- |
| Rated Thermal Output | 2436 Mwt | |
| Average Power Density | 51.21 kW/1 | |
| Core Inlet Enthalpy | 526.9 BTU/lb | |
| Core Average Void Fraction | 0.422 | |
| Number of Fuel Assemblies | 560 | |
| Active Core Height | 150.0 in | (381.0 cm) |
| Assembly Pitch | 6.0 in | (15.24 cm) |
| Number of Control Rod Ass. | 137 | |
| Control Rod Stroke | 144.0 in | (365.76 cm) |
| Control Rod Notch Height | 6.0 in | (15.24 cm) |
| Control Rod Pitch | 12.0 in | (30.48 cm) |
| Shroud Outside Diameter | 178.0 in | (452.12 cm) |
| Reactor Pressure Vessel Inside Diameter | 218.0 in | (553.72 cm) |
| Number of Jet Pumps | 20 | |
| Number of LPRM Strings | 31 | |

Figure 2:
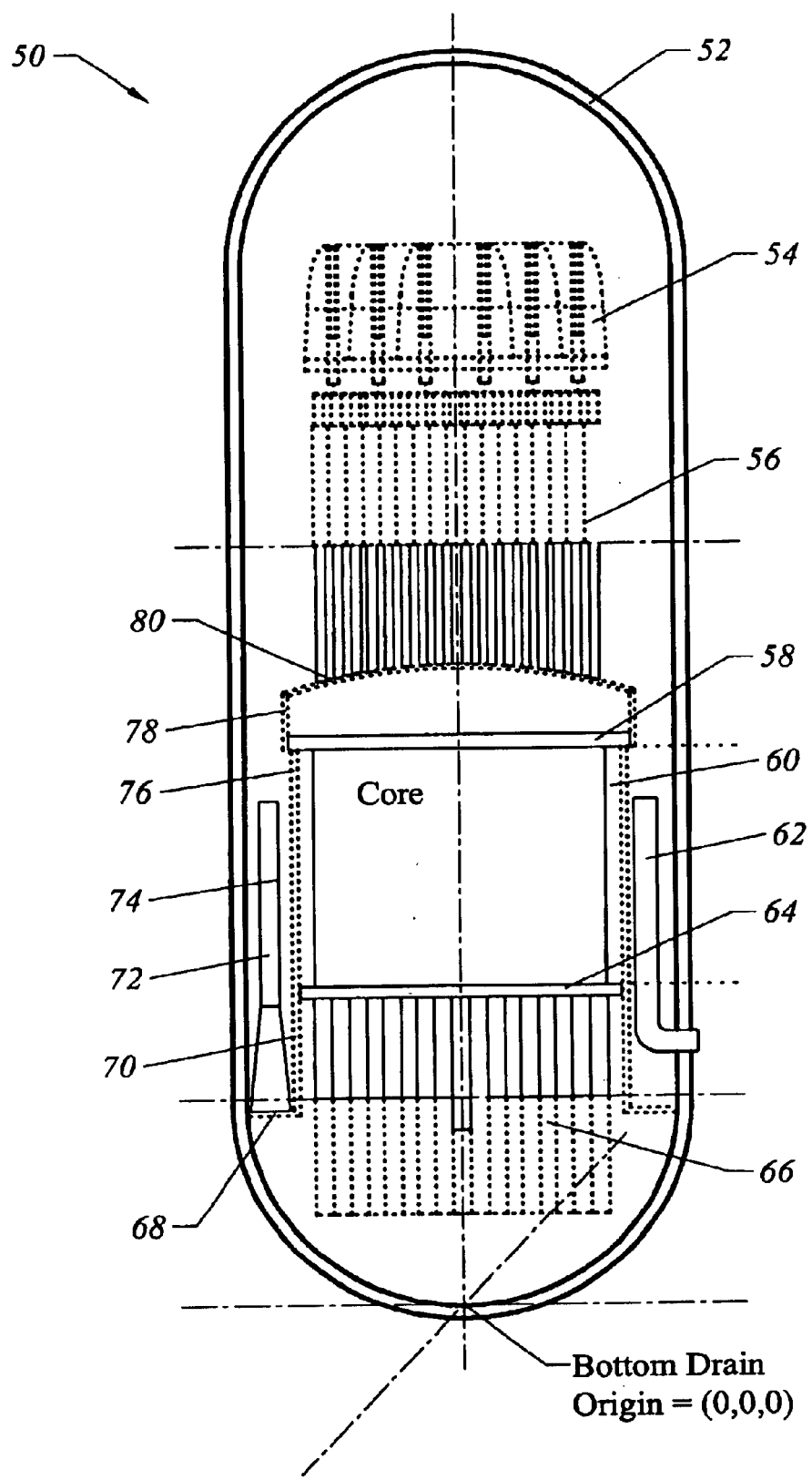
FIG. 2 is a cutaway view of a nuclear reactor assembly analyzed in accordance with an embodiment of the invention.

FIG. 2 is a cutaway view of a nuclear reactor assembly 50. The nuclear reactor assembly 50 includes the following conventional components: a pressure vessel 52, a steam dryer assembly 54, steam separators 56, a top guide 58, a reflector 60, a jet pump riser 62, a support plate 64, control rod guide tubes 66, a baffle plate 68, a lower shroud 70, a jet pump diffuser 72, a jet pump mixer 74, a central shroud 76, an upper shroud 78, and a shroud head 80. As shown in FIG. 1, details of this architecture are input into the system 20. The CAD program 32 is used to electronically model the nuclear reactor assembly 50. In other words, the CAD program 32 establishes a three-dimensional representation of the nuclear reactor assembly 50. The representation includes all of the major structural components, reactor fuel and coolant flow regions that lied in the axial elevations from just above the shroud baffle plate to just below the steam separators in the reactor pressure vessel.

The radiolysis analyses performed herein assume octant symmetry in the radial dimension of the model. The octant symmetric models described herein reference the East-North-East region of the plant reactor assembly, which corresponds to the azimuthal angles 45 to 90 degrees.

For modeling simplicity, the reactor assembly model is characterized in three axial zones: (1) below the active fuel zone, (2) the active fuel zone, and (3) above the active fuel zone. For additional computational efficiency, several of the components and flow regions in the rector assembly model are homogenized to form a simpler geometry meshing.

Figure 3:
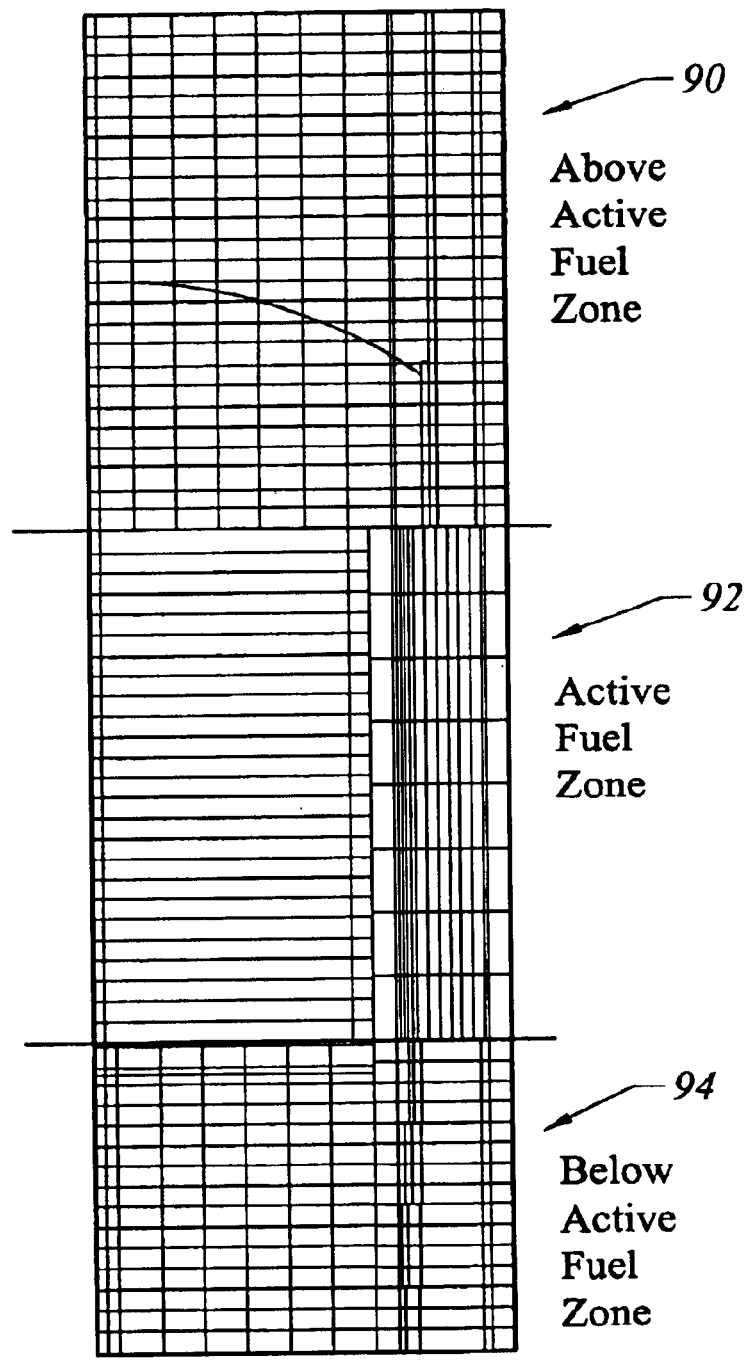
FIG. 3 is a side view of plant model meshing in accordance with an embodiment of the invention.

Model approximations reduce problem complexities and computer execution times. The approximations include region homogenization and symmetry reduction. The final ex-core geometry model for the example plant contains 3,368 volume elements that represent various components of the nuclear reactor 50. Each component is usually made of several volume elements that comprise a mesh. Manx regions of the reactor, such as the shroud, or the down-corner region are cylindrical in shape, therefore, arc-shaped geometry elements accurately describe these areas. Other geometric elements, such as cubes, cylinders or wedges, are used as well to define other areas of the reactor. An arbitrary geometry library file for each region modeled contains the dimensions and shape, location and material description of each fundamental element used to describe the region. FIG. 3 is a side view cutaway illustrating a meshing scheme that me be used in accordance with an embodiment of the invention.

Figure 4:
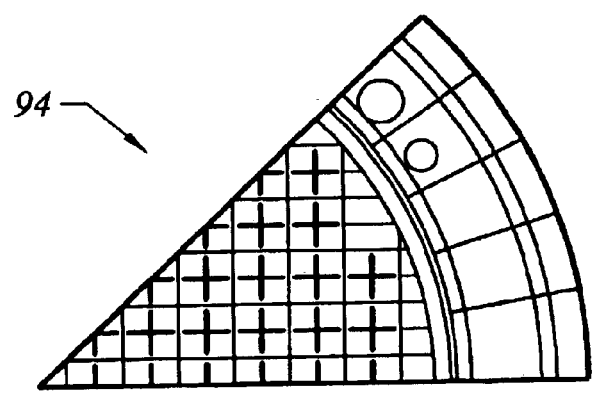
FIG. 4 is a top view of meshing characterizing a region beneath an active fuel zone.

FIG. 3 illustrates: (1) an above active fuel zone 90; (2) an active fuel zone 92; and (3) a below active fuel zone 94. The below active fuel zone consists of the regions that lie below the elevation of the bottom of active fuel. This zone extends downward to an elevation of about 6 inches above the baffle plate. This includes the lower fuel assembly parts, tie plates, fuel support pieces, core support plate, control blades, control rod guide tubes, shroud cylinder, lower down-corner, jet pumps, and pressure vessel. Some of these parts are not explicitly modeled, but are represented by appropriately homogenized materials within each region. A top view of the below active core zone 94 near the bottom of active fuel is shown in FIG. 4.

Figure 5:
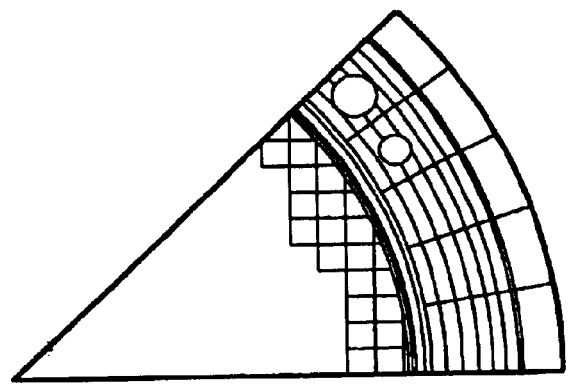
FIG. 5 is a top view of meshing characterizing an active fuel zone region.

The active fuel zone 92 consists of the regions between the elevations of the bottom active fuel zone 94 and the top active fuel zone 90. This includes the core fuel assemblies, core reflector, shroud cylinder, down-corner, jet pumps, and pressure vessel. For this model, the fuel material in the core region is provided by the utility for every fuel nodal location in the core. To facilitate analysis, the internal (non-peripheral) fuel assemblies are homogenized into a single region for each plane. The peripheral fuel assemblies were maintained in a finer nodal geometry form to capture the importance of flux gradients at the core-core reflector interface. A top view of the core mid plane region is shown in FIG. 5.

Figure 6:
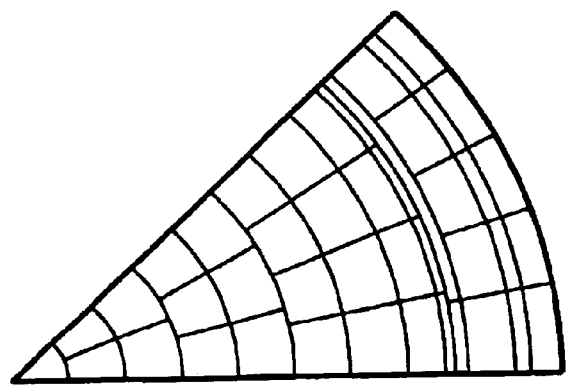
FIG. 6 is a top view of meshing characterizing a region above an active fuel zone.

The above active fuel zone 90 consists of the regions that lie above the elevation of the top of the active fuel plane. This includes the upper fuel assembly parts, top guide, upper shroud plenum, shroud cylinder, shroud head, steam separator stand pipes, upper down-corner, pressure vessel and other appropriate coolant flow regions. In some instances, the regions are comprised of more than one physical component. The individual components in these regions are not explicitly modeled, but are represented by appropriately homogenized materials within each active region. A top view of geometry meshing in the plane near the top of the active fuel is shown in FIG. 6.

Figure 7:
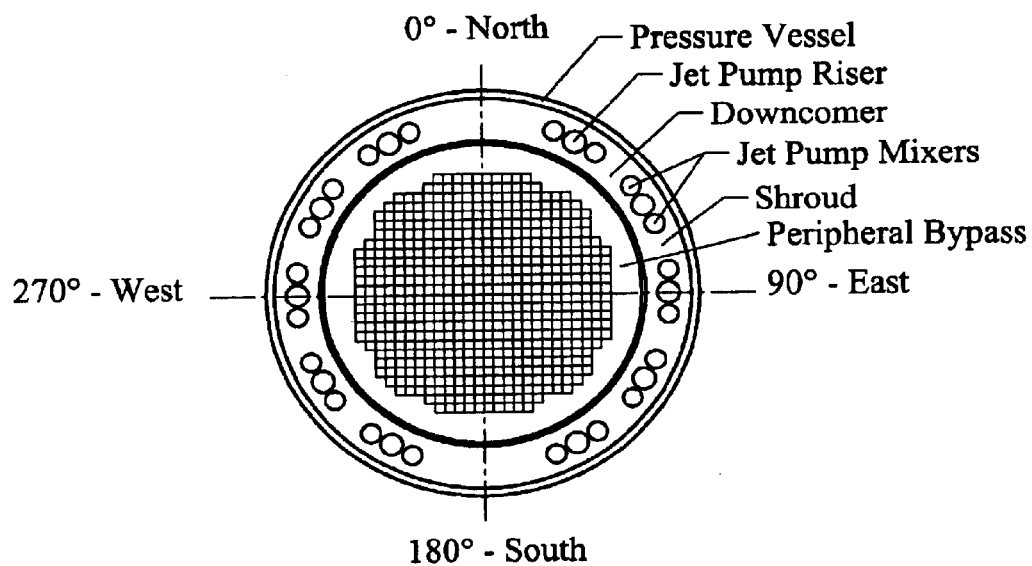
FIG. 7 illustrates radial locations of components in an active fuel zone.

Each region of the reactor 50 is modeled. By way of example, the modeling of the active core region is described. Analogous modeling operations are performed for the other regions of the reactor 50. FIG. 7 shows the radial shape of the core region as viewed from the top of the reactor 50. The rector core region contains 560 fuel assemblies. Each fuel assembly is a rectangular shaped element that is loaded vertically in the core region in a configuration that approximates a cylindrical body. The axial boundaries of the reactor core region are defined by the lower boundary of the fuel assemblies (the bottom of active fuel) and the upper boundary of the fuel assemblies (the top of active fuel). The radial boundaries of the reactor core region are defined by the outer surfaces of the fuel assemblies loaded on the periphery of the core region.

Figure 8:
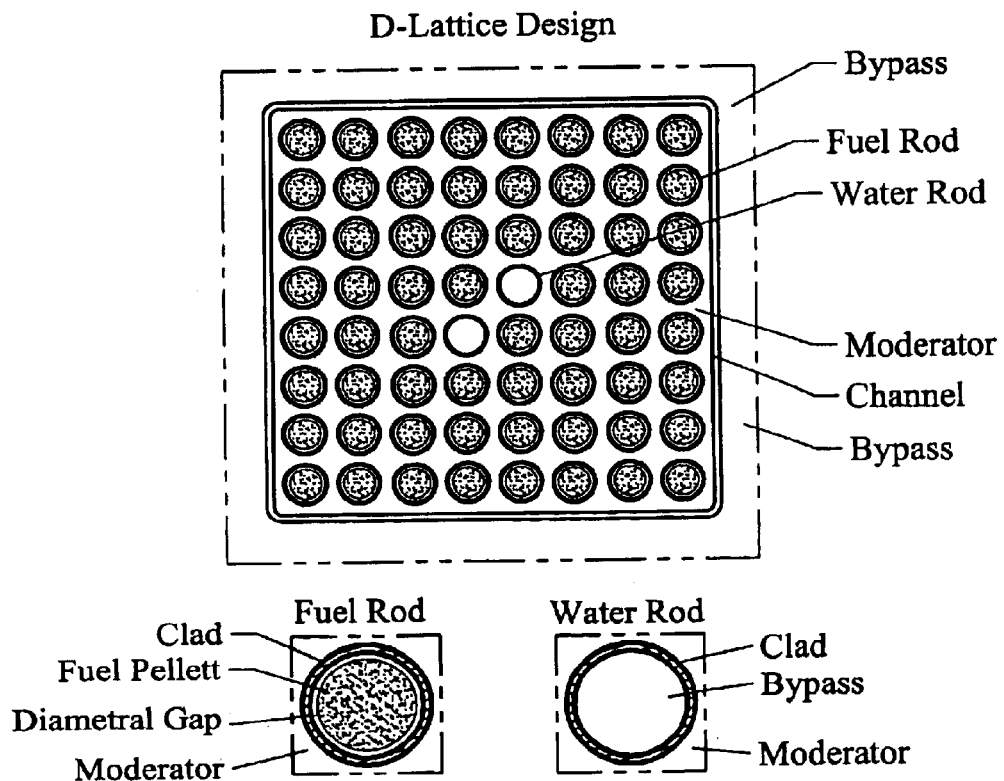
FIG. 8 illustrates a typical fuel assembly design that is analyzed in accordance with an embodiment of the invention.

Each assembly is comprised of a fuel bundle and channel. The fuel bundle is a square lattice comprised of fuel rods and water rods. The channel is a square tube that surrounds the fuel bundle. Moderator coolant flows inside the channel to cool the fuel rods and to moderate the fission neutrons. Bypass coolant flows outside the channel to further moderate the fission neutrons. FIG. 8 shows a top view of a typical fuel assembly design containing an 8×8 array of rods and a fuel channel. The entire reactor core region may be modeled.

However, considerations for computer run-times and calculational accuracy require different models for different applications. Consequently, in addition to octant model reduction, two model approximations are employed. First, the peripheral fuel bundles of the core are represented using nodal geometry modeling techniques. Nodal geometry models are approximations of the actual core geometry that mesh the region into equal volume cubes, or nodes, containing a homogenized material. In the model, each node has the dimensions 6 inches×6 inches×6 inches.

Within each region defined by the nodal meshing scheme, the fuel assembly parts are homogenized to form a single material description that preserves the nuclear characteristics of the detailed parts. This approximation is made to reduce the geometry detail of the core region in order to reduce the computation time required to solve the flux problems in the core region. For most ex-core region calculations, the nodal model approach provides a reasonable mesh approximation for estimating particle transports in the ex-core regions of the reactor assembly model. In the model, the volume identifier CORNOD indicates volume elements of this type.

Figure 9:
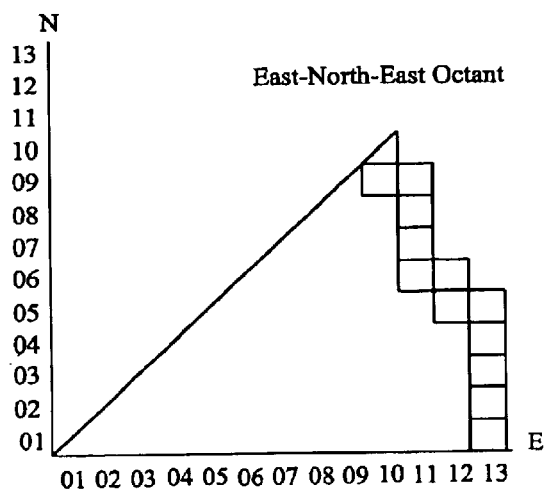
FIG. 9 is a top view of meshing characterizing a reactor core.
Figure 10:
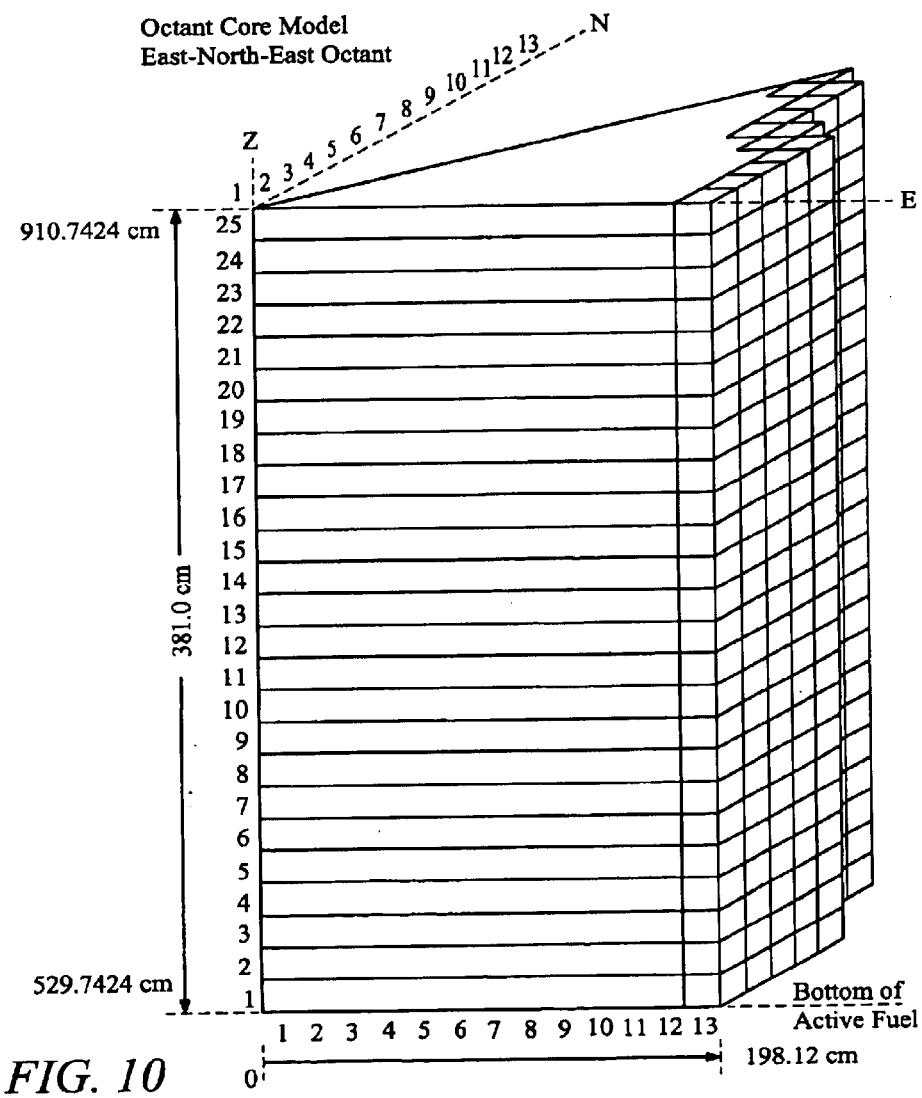
FIG. 10 is an isometric view of meshing characterizing a reactor core region.
Figure 12:
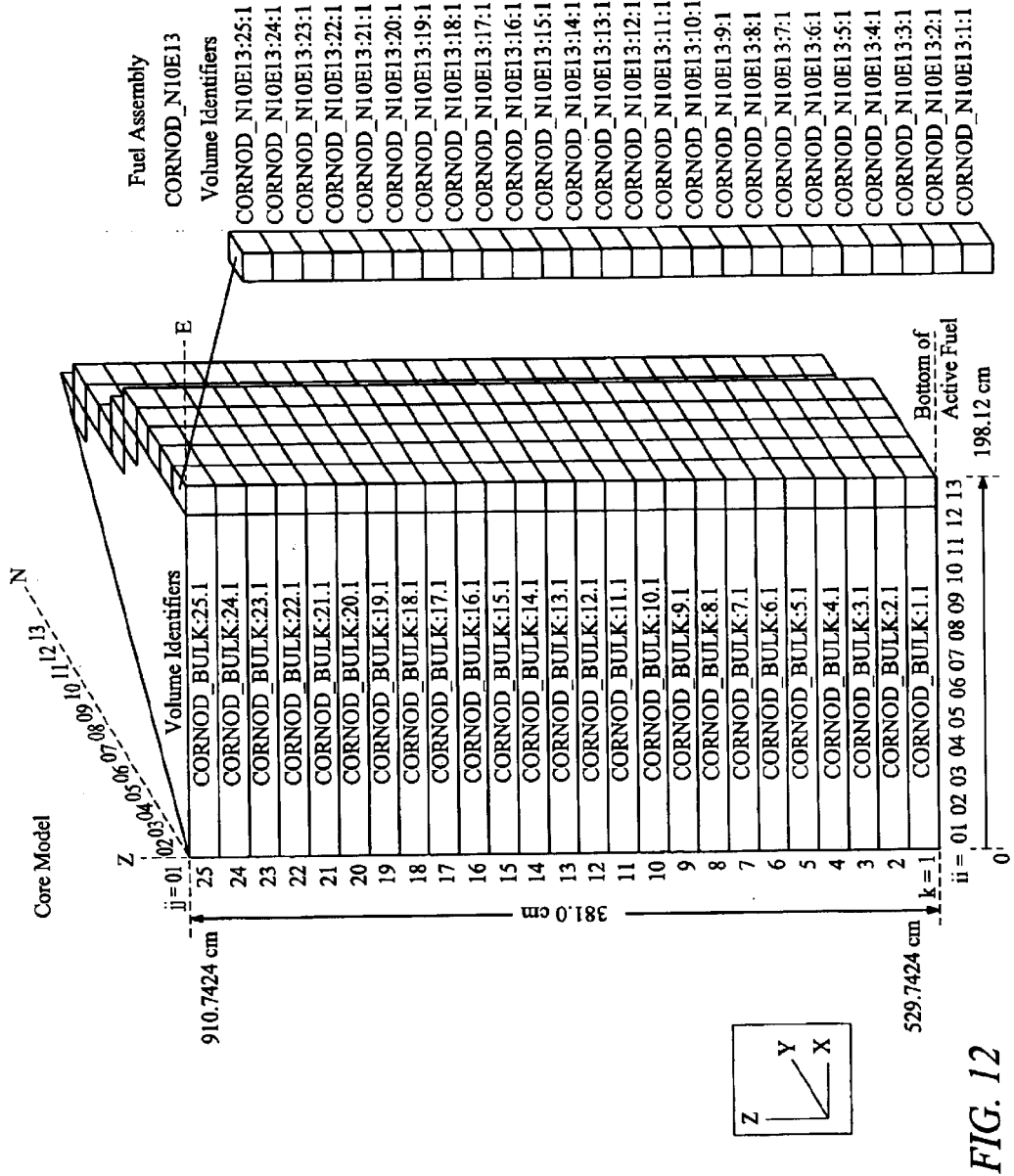
FIG. 12 is a three-dimensional model of the reactor core region with volume identifiers processed in accordance with an embodiment of the invention.

In order to further reduce the computation time of the problem, all of the remaining interior fuel bundles are homgenized into one bulk mass per 6 inch elevation. Each bulk mass carries CORNOD_BULK as a volume identifier. Hence, the final model contains one bulk mass, 13 peripheral bundles per plane and 25 planes producing a total of 350 volume elements in the model. FIG. 9 shows a two-dimensional plane of the reactor core geometry as viewed from the top of the reactor assembly and FIG. 10 shows the three-dimensional model of the region. FIG. 11 is a table listing the volume and material identifiers that describe the core model and FIG. 12 shows the assignment of volume identifiers to their appropriate elements of the region.

After the three-dimensional geometry description 33, radiation source description 34, and material composition 36 are input into the system 20 and are modeled by the CAD system 32, the particle transport analysis program 31 executes the following unique formulations of the Boltzmann equation to preserve angular particle motion in a deterministic integral transport methodology.

I. Particle Transport Equation

The basic equation that describes both neutron and gamma transport is the well known Boltzmann equation. The steady state form of this equation can be expressed as:

$$\Omega \cdot \nabla \Phi(r,\Omega,E) + \Sigma_t(r,E)\Phi(r,\Omega,E) = q(r,\Omega,E) \quad (1)$$

with $$q(r, \Omega, E) = \int\int \Sigma_s(r;\Omega',E' \to \Omega, E)\Phi(r, \Omega', E')d\Omega'dE' + Q(r, \Omega, E) \quad (2)$$

where $\Phi(r,\Omega,E)$ the angular flux in the $\Omega$ direction at location r with energy E. $\Sigma_t(r,E)$ is the total removal cross-section at location r with energy E, $\Sigma_s(r;\Omega',\to\Omega,)$ is the cross-section at location r for scattering from direction $\Omega'$ with energy E' to direction $\Omega$ with energy E, and $Q(r,\Omega,E)$ is the neutron or gamma, as appropriate, source at location r in the $\Omega$ direction with energy E.

The physical interpretation of the terms in the above equations can be visualized quite easily by considering an infinitesimally small "packet" consisting of all particles at location r that are traveling in direction $\Omega$ with energy E. The first term on the left side of eq. (1) is the rate at which particles leave the "packet" by migrating (or "streaming") out without an interaction. (Note that because of the definition of the "packet" of interest, this "streaming" must occur only in the $\Omega$ direction.) The second term on the left side of eq. (1) is the rate at which particles are removed from the ; packet by interactions that either directly remove the particles (e.g., absorption) or by scattering them into a new direction and/or a new energy (i.e., moving them into a new "packet"). The first term on the right side of eq. (2) represents the rate at which particles enter the "packet" of interest by being scattered in from a different "packet". The last term on the right side of eq. (2) is the rate at which particles enter the "packet" of interest by all other means (e.g., production by fission or activation and specified external surface or volume production).

The first term of eq. (1) can be simplified by noting, as was discussed in the previous paragraph, that all of the streaming must occur along the $\Omega$ direction. Defining the position vector in terms of distance, s, along the $\Omega$ vector such that $r=r_0+s\Omega$ leads to the simplification:

$$\Omega \cdot \nabla \Phi \to \frac{d}{ds}\Phi(r_0 + s\Omega, \Omega, E) \quad (3)$$

which allows eq. (1) to be written as $$\frac{d}{ds}\Phi(r_0 + s\Omega, \Omega, E) + \Sigma_t(r_0 + s\Omega, E)\Phi(r_0 + s\Omega, \Omega, E) = q(r_0 + s\Omega, \Omega, E) \quad (4)$$

Eq. (4) is a first order differential equation that forms the basis for determining the angular flux in a general geometry system. (Note that technically, eq. (4) is an integro-differential equation, since the right side contains an integral scattering source term.) A discrete solution of eq. (4) can be obtained by any of several means. Historically, discrete ordinates methods have been utilized to solve the integral angular flux equation for regular mesh geometry problems. However, discrete ordinates methods are not well suited to arbitrary geometry modeling. For applications that require general geometry modeling capabilities, it is desirable to solve eq. (4) by means of a solution technique that utilizes an integral volume solution methodology, such as a collision probability solution methodology or a method-of-characteristics solution methodology. Determining the best solution methodology to use for general geometry ex-core applications requires an assessment of the relative merits of each alternative.

II. Collision Probability Solution Methodology

The use of collision probabilities to solve the Boltzmann equation has been well established for 2-dimensional geometries with isotropic scattering. These traditional assumptions are generally suitable for in-core applications, such as lattice physics analyses, however, ex-core applications require a solution methodology that is capable of accurately representing directional particle streaming in highly non-uniform geometries. Therefore, use of collision probabilities requires that the traditional methodology be extended to include 3-dimensional geometry capability with anisotropic scattering treatment.

In spite of the additional complexity and computational expense that the 3-dimensional anisotropic scattering capability imposes on the classical formulation of collision probabilities, the methodology provides some important advantages over other methods that utilize discrete ordinates solution techniques. One key advantage is the ability to accurately and efficiently solve non-uniform geometry problems, while utilizing a substantially coarser region meshing than would be acceptable with discrete ordinates methods. In addition, the extension of the methodology to 3-dimensional geometries poses no great computational difficulty. However, since the collision probability technique requires the formulation and solution of a highly coupled transmission probability matrix equation, the storage requirements can increase dramatically as the number of solution regions increases.

This section describes the derivation of the integral form of the steady state nuclear transport equation that is used to solve for neutron and gamma-ray particle fluxes. Included in this section are descriptions of the treatments for anisotropic scattering and the procedure for solving the coupled equations in either two-dimensional or three-dimensional geometry.

III. Anisotropic Scattering Formulation

In order to cast the Boltzmann equation into a form that is suitable for solution by collision probability methodology, it is necessary to convert the basic differential equation into a volume integral form. As a first step in this conversion, an appropriate exponential integrating factor can be introduced into eq. (4) and the integration can be performed directly to yield:

$$\Phi(r, \Omega, E) = \int_0^\infty e^{-\int_0^{s'} \Sigma_t(r - s''\Omega, E) ds''} q(r - s'\Omega, \Omega, E) ds' \qquad (5)$$

When isotropic scattering can be assumed, both sides of eq. (5) can be multiplied by the differential solid angle, $d\Omega$, and integrated over all solid angles. This has the effect of producing a volume integral equation since $$ds' d\Omega = \frac{dV'}{|r - r'|^2} \qquad (6)$$

where $$r' = r - s'\Omega \qquad (7)$$

Unfortunately, this approach cannot be used when anisotropic scattering must be considered, since it is necessary to retain the angular dependence of eq. (5). It is possible, however, to form an angular-dependent volume integral equation that is similar to the classic isotropic scattering integral equation commonly found in collision probability theory.

Let $\Psi(r, \Omega_0, E_0)$ be the angular scattering density, i.e. the number of particles per unit volume that appear due to scattering collisions per steradian about $\Omega_0$ and per unit energy $E_0$. Then $$\Psi(r, \Omega_0, E_0) \equiv \int\int \Sigma_s(r; \Omega, E \to \Omega_0, E_0) \Phi(r, \Omega, E) d\Omega dE \qquad (8)$$

If eq. (5) is multiplied on both sides by the factor $[\Sigma_s(r;\Omega, E\to\Omega_0,E_0) d\Omega dE]$ and the integration carried out over all solid angles and all energy, the result, after utilizing eqs. (6), (7), and (8), can be written as:

$$\Psi(r, \Omega, E) = \int\int \frac{e^{-\tau(r' \to r; E')}}{|r - r'|^2} \Sigma_s(r; \Omega', E' \to \Omega, E) q^*(r', \Omega', E') dV' dE \qquad (9)$$

where $$q^*(r',\Omega',E') = \Psi(r',\Omega',E') + Q(r',\Omega',E') \qquad (10)$$

and the exponential argument has been represented by the simplified expression $\tau(r' \to r; E')$, which denotes the "optical path length" from location r' to location r at energy E'.

Eq. (9) is the fundamental volume integral equation that is used to solve for the anisotropic scattering density (and, ultimately, the scalar flux) using collision probability theory. In practice, the solution of eq. (9) using digital computers requires that the equation be recast into a discrete form by making the following assumptions regarding the solution space:

1) The solution region is composed of N discrete volumes wherein the angular flux and material properties are constant;
2) The total solid angle space can be represented by K discrete solid angle directions.
3) The total energy range can be represented by G discrete energy groups.

Applying the above assumptions to eq. (9) and utilizing the definitions presented in eqs. (6) and (7) allows the integral volume equation to be written in the following discretized form:

$$\Psi_{i,k,g} = \sum_{j=1}^{N} \sum_{g'=1}^{G} \sum_{k'=1}^{K} \Sigma^s_{i,k'\to k, g'\to g} T_{i \leftarrow j, k', g'} (\Psi_{j,k',g'} + Q_{j,k',g'}) \qquad (11)$$

where $\Psi_{i,k,g}$ is the angular scattering density in volume $V_i$ with direction $\Omega_k$ in energy group g, $Q_{j,k',g'}$ is the particle source density in volume $V_j$ with direction $\Omega_{k'}$ in energy group g', $\Sigma^s_{i,k'\to K, g'\to g}$ is the anisotropic scattering cross-section per unit steradian in volume $V_i$ for scattering from direction $\Omega_{k'}$ in group g' into direction $\Omega_k$ in group g, and $T_{i\leftarrow j,k',g'}$ is an angular transmission coefficient that is a measure of the probability that a particle from $V_j$ traveling in the $\Omega_{k'}$ direction in energy group g' will reach $V_i$ without a collision. The angular transmission coefficient takes the form:

$$T_{i \leftarrow j,k',g'} = \frac{1}{4\pi V_i} \int_{\Delta\Omega_{k'}} \int_0^\infty \int_{V_j} e^{-\tau(r'\to r; E_{g'})} dV ds' d\Omega' \qquad (12)$$

For calculational purposes, the anisotropic scattering cross section may be represented by a partial expansion of Legendre polynomials such that $$\Sigma_{i,k'\to k, g'\to g} \approx \sum_{m=0}^{M} (2m+1)\Sigma^{(m)}_{i,g'\to g} P^{(m)}(\mu_{k'\to k}) \qquad (13)$$

where $\Sigma^{(m)}_{i,g'\to g}$ is the m-th order scattering moment in volume $V_i$ from energy group g' to energy group g, $P^{(m)}$ is the m-th order Legendre polynomial and $\mu_{k'\to k}$ is the cosine of the angle between $\Omega_{k'}$ and $\Omega_k$, that is $$\mu_{k'\to k} = \Omega_{k'} \cdot \Omega_k \qquad (14)$$

The angular flux can be determined from the angular scattering density by noting that the discretized form of eq. (8) can be expressed as:

$$\sum_{g'=1}^{G} \sum_{k'=1}^{K} \sum_{i,k'-k,g'-g}^{s} \Phi_{i,k',g'} W_{k'} = \Psi_{i,k,g} \quad (15)$$

where $\Phi_{i,k',g'}$ is the angular flux in volume $V_i$ in the $\Omega_{k'}$ direction in energy group g', $\Sigma_{i,k'\to k,g'\to g}$ is the anisotropic scattering cross section in volume $V_i$ for scattering from direction $\Omega_{k'}$ in group g' to direction $\Omega_k$ in group g, and $W_k$ is the fraction of the total surface area about a unit sphere that is subtended by the differential solid angle $\Delta\Omega_k$, about direction $\Omega_{k'}$, i.e., $$W_{k'} = \frac{\Delta\Omega_{k'}}{4\pi} \quad (16)$$

Once the angular flux has been determined from eq. (15), the energy-dependent scalar flux in each region, $\phi_{i,g}$, is obtained from:

$$\varphi_{i,g} = \sum_{k=1}^{K} \Phi_{i,k,g} \Delta\Omega_k \quad (17)$$

IV. Fixed Source Solution Methodology

If the power distribution is known a priori for all source volumes in the problem (e.g., they are determined through external means, such as from 3D nodal simulator codes), then the source terms in eq. (11) can be determined without the need for solving the traditional eigenvalue problem that is typical of lattice physics solution methodologies. The resulting problem is generally referred to as a "fixed source solution" since the total source term in each solution volume is known explicitly from the power distribution. In general, an iterative approach will still be required in order to determine the source terms for use in eq. (11) since the distribution of the source over energy groups is not known, even though the total source term is given. This subsection describes the method of solving for the scattering density, the angular flux, and, ultimately, the scalar flux for a fixed source solution problem.

In any operating reactor system, the source of neutrons can be assumed to be exclusively the result of the fission process in the core region. It is also reasonable to assume that the fission process emits neutrons isotropically. Under these assumptions, the anisotropic neutron source term can be expressed in the form:

$$Q_{i,k,g}^{N} = p_i P_D W_k \frac{\sum_{n=1}^{N} \chi_{n,g} \sum_{g'=1}^{G} (\nu\Sigma^f)_{n,g'} \varphi_{i,g'}}{\sum_{g'=1}^{G} \sum_{n=1}^{N} K_n^f \sum_{n,g'}^{f} \varphi_{i,g'}} \quad (18)$$

where $p_i$ is the relative power (normalized to a core volume average value of 1.0) in volume $V_i$, $P_D$ is the power density (watts/cm$^3$) in the core region, $\chi_{n,g}$ is the fraction of neutrons emitted into energy group g from a fission of nuclide n, $(\nu\Sigma^f)_{n,g'}$ is the fission production cross-section for fissile nuclide n in energy group g'. $\kappa_n$ is the energy produced from a fission of fissile nuclide n (joules/fission). $\Sigma^f_{n,g'}$ is the fission cross-section of fissile nuclide n in energy group g', and $N_i$ is the total number of fissile nuclides in volume $V_i$.

The algorithm for solving eq. (11) can be developed by rewriting the equation so that all scattering density elements in a given group are contained on the left side of the equation. This results in the following expression for the angular scattering density in any energy group g:

$$\Psi_{i,k,g} - \sum_{j=1}^{N} \sum_{k'=1}^{K} \sum_{i,k'-k,g-g}^{s} T_{i-j,k',g} \Psi_{j,k',g} = Q_{i,k,g}^{*} \quad (19)$$

where $$Q_{i,k,g}^{*} = \sum_{j=1}^{N} \sum_{k'=1}^{K} \left( \sum_{g'=1}^{G} \sum_{i,k'-k,g'-g}^{s} T_{i-j,k',g'} Q_{j,k',g'}^{N} + \sum_{\substack{g'=1 \\ g'=g}}^{G} \sum_{i,k'-k,g'-g}^{s} T_{i-j,k',g'} \Psi_{j,k',g'} \right) \quad (20)$$

Eqs. (19) and (20) can be expressed in matrix form as:

$$[R_g]\vec{\Psi}_g = \vec{Q}^{*}_g \quad (21)$$

Eq. (21) represents a set of (N*K) equations that can be solved by standard matrix solution techniques to yield the individual elements of the angular scattering density in each energy group. The usual procedure for solving eq. (21) is to progress sequentially through the energy groups starting with the highest energy group. When there is no up-scatter into the energy group being solved the right side of eq. (19) contains only angular scattering density terms for groups from 1 through g-1, which are already known from earlier solutions of eq. (21). When up-scatter is present, it is necessary to iterate over the affected groups (i.e., over all the groups in which up-scatter is present) until convergence is achieved.

Eq. (15) can be rewritten in a form that is more suitable for iterative solution:

$$\sum_{k'=1}^{K} \sum_{i,k'-k,g-g}^{s} \Phi_{i,k',g} = \Psi_{i,k,g} - \sum_{\substack{g'=1 \\ g' \neq g}}^{G} \sum_{k'=1}^{K} \sum_{i,k'-k,g'-g}^{s} \Phi_{i,k',g'} \quad (22)$$

or, in matrix form as:

$$[S_{i,g}]\vec{\Phi}_{i,g} = \vec{\Psi}^{*}_{i,g} \quad (23)$$

Eq. (23) represents a set of K equations for each energy group and region. The procedure for solving eq. (23) is virtually identical to that used to determine the angular scattering density in eq. (21). As with eq. (21), the solution should start with the highest energy group and progress sequentially to the lowest energy group. When no up-scatter is present, the solution for a group is complete, however, when up-scatter is present in any group being solved, it is necessary to iterate over the up-scatter groups until convergence is achieved.

Note that although the source terms in the right side of eq. (19) contain flux terms, as seen in eq. (18), the variation of flux over energy groups is not very large, so it is possible to employ an outer (fission) iteration technique that is similar to that utilized in the CPM-3 computer program [12] in order to resolve the inherent implicit nature of eq. (19). In this approach, the source term is assumed to be invariant with flux while the angular scattering density is iteratively solved for all regions and energy groups. When a converged solution for angular scattering density is obtained, the resulting scalar flux term is determined and the fission source term is updated. The angular scattering density with this new fission source term is then determined. The complete process is continued until successive iterations produce a negligibly small change in scalar flux. The solution process for fixed source problems can be summarized as follows:

1) The angular flux terms are initially assumed to be unity. The corresponding angular scattering density terms are then determined from eq. (15) and the scalar flux terms are determined from eq. (17).
2) The angular source terms are computed using eqs. (18) and (20).
3) An updated estimate of the angular scattering density is obtained by iteratively solving the (N*K) simultaneous equations represented by eq. (19) for each energy group in order starting with group 1. Convergence is achieved when the largest observed deviation from one iteration to another for any angular scattering density term does not exceed a defined small quantity.
4) The angular source terms for all up-scatter groups are updated using eq. (20).
5) An updated estimate of the angular scattering density in the up-scatter groups is determined by solving the (N*K) simultaneous equations represented by eq. (19) for each up-scatter energy group, as was done in step 3.
6) Steps 4 and 5 are repeated until the maximum deviation from one iteration to the next for any angular scattering density term does not exceed a defined small quantity.
7) The set of K simultaneous equations in each energy group represented by eq. (23) are solved using the initial unity assumption for all angular flux terms from step 1. Each energy group is solved in order starting with group 1. Iteration continues in each group until the maximum deviation of any flux term from one iteration to the next does not exceed a defined small quantity.
8) The right side of eq. (19) is updated for all up-scatter energy groups using the angular flux values obtained from step 7.
9) The set of K simultaneous equations represented by eq. (23) are updated for each of the up-scatter energy groups by iterative solution in the same manner as step 7.
10) Steps 8 and 9 are repeated until the maximum deviation in any angular flux term from one iteration to the next does not exceed a defined small quantity.
11) The group-dependent region scalar fluxes are determined from eq. (17).
12) Steps 2 through 11 are repeated until the change in scalar flux from one iterative pass to another does not exceed a defined small quantity.

V. Eigenvalue (Fission) Solution Methodology

If no externally determined power distribution is available, it is necessary to utilize the general eigenvalue method of solving for the flux distribution. In this process, the calculated flux distribution is the one that maintains criticality within the core region being modeled. This procedure is analogous in many ways to that employed in most lattice physics codes, including CPM-3.

The fixed angular source density in eq. (19) can be expanded to include a fission term in the form:

$$\Psi_{i,k,g} - \sum_{j=1}^{N} \sum_{k'=1}^{K} \sum_{i,k'-k,g-g}^{s} T_{i-j,k',g} \Psi_{j,k',g} = Q_{i,k,g}^{F} \quad (24)$$

with $$Q_{i,k,g}^{F} = Q_{i,k,g}^{*} + \lambda \sum_{j=1}^{N} \sum_{k'=1}^{K} \sum_{g'=1}^{G} \sum_{i,k'-k,g'-g}^{s} T_{i-j,k',g'} S_{j,k',g} \quad (25)$$

where $Q^{F}_{i,k,g}$ and $Q^{*}_{i,k,g}$ are the total and fixed angular source densities, respectively, in volume $V_j$ in direction $\Omega_k$ in energy group g, $\lambda$ is the eigenvalue that must be determined from criticality conditions, and $S_{i,k',g'}$ is the angular fission source density in volume $V_j$ in direction $\Omega_{k'}$ in energy group g' (i.e., the rate of fission production per unit volume of neutrons in the $\Omega_{k'}$ direction with energy g'). If fission neutrons are assumed to be produced isotopically, then the angular fission source density is given by:

$$S_{j,k',g'} = \chi_{j,g'} F_j W_{k'} \quad (26)$$

where $\chi_{j,g'}$ is the fraction of fission neutrons that appear in volume $V_j$ with energy g' and $F_j$ is the fission rate in $V_j$ given by $$F_j = \sum_{g''=1}^{G} \nu \Sigma_{j,g''}^{f} \varphi_{j,g''} \quad (27)$$

where $\nu\Sigma^{f}_{j,g''}$ is the neutron production cross-section for fissions occurring in $V_j$ at energy g'', and $\phi_{j,g''}$ is the scalar neutron flux in $V_j$ at energy g''. The eigenvalue in eq. (25) is selected so that the total fission source is normalized to unity by requiring that:

$$\lambda \sum_{j=1}^{N} \sum_{g'=1}^{G} \chi_{j,g'} F_j V_j = 1 \quad (28)$$

The scalar flux and the angular scattering density are interrelated, so that the source term in eq. (24) is actually implicitly related to the left side of the equation. However, the use of an iterative solution scheme allows the terms to be treated explicitly, with the necessary coupling occurring through an outer (fission) iteration, as was described for the fixed source solution. The solution algorithm for the eigenvalue solution problem is the same as the fixed source problem, except that the normalized eigenvalue is utilized instead of the absolute flux computation present in the fixed source problem. The solution steps are summarized as follows:

1) An initial guess of the scalar flux is made (typically unity is assumed for all flux elements).
2) The total fission source from eq. (27) is determined using the scalar flux estimate.
3) The angular fission source density and the eigenvalue are determined from eqs. (26) and (28), respectively.
4) The total angular source density is determined from eq. (25).
5) The scalar flux is determined by solving eq. (24) as a fixed source problem using the steps identified in Section IV.
6) The updated scalar flux estimate from step 5 is used in step 2 above to continue the iterative solution process until the scalar flux converges to a defined small quantity.

VI. Evaluating the Angular Transmission Coefficient

The angular transmission coefficient defined in eq. (12) can be expressed in the form:

$$T_{i-j,k',g'} = \frac{W_{k'}}{V_i} \int_0^{d_j} \int_{V_i} e^{-\tau(r'-r,E_{g'})} dV \, ds' \tag{29}$$

where $d_j$ is the distance through volume $V_j$ in the $\Omega_{k'}$ direction and $\Delta\Omega_{k'}$ is the area subtended by the discrete solid angle $\Omega_{k'}$ about a unit sphere.

The remaining integrals in eq. (29) can be evaluated using a technique that is based upon a parallel line methodology, as described in I. Carlvik, "A Method for Calculating Collision Probabilities in General Cylindrical Geometry and Applications to Flux Distributions and Dancoff Factors", *Proc. Int. Conf. On Peaceful Use of Atomic Energy*, 1964, p. 681. When evaluating eq. (29) for two-dimensional analyses, the parallel line methodology can be implemented directly, however, three-dimensional analyses require a logical extension of the methodology. The evaluation of eq. (29) for both three-dimensional and two-dimensional analyses follows.

VII. Three Dimensional Analyses

In order to evaluate eq. (29) in three-dimensional geometry, it is convenient to consider a local coordinate system composed of orthogonal axes with one axis oriented along the direction vector $-\Omega_{k'}$. The spatial derivative, dV, can be expressed in terms of the local coordinate system as:

$$dV = dA \, ds \tag{30}$$

where dA is the differential cross-sectional area normal to the direction vector and ds is the differential length along the direction vector. Note that in the local coordinate system, both ds and ds' lie along the direction vector $\Omega_{k'}$. Substituting eq. (30) into eq. (29) allows the angular transmission coefficient to be expressed as:

$$T_{i-j,k',g'} = \frac{W_{k'}}{V_i} \int dA \int_0^{d_i} \int_0^{d_j} e^{-\tau(r'-r,E_{g'})} ds \, ds' \tag{31}$$

where $d_i$ is the distance through volume $V_i$ in the $\Omega_{k'}$ direction. When regions I and j are different regions the optical path length, $\tau$, along the direction vector $\Omega_{k'}$ can be represented as being composed of three discrete parts:

$$\tau(r'-r, g') = \sum_{i,g'}^t s + \sum_{j,g'}^t s' + \sum_n \sum_{n,g'}^t d_n \tag{32}$$

where $\Sigma_t^{i,g'}$ is the total removal cross-section for energy group g' in volume $V_i$, $\Sigma_t^{j,g'}$ is the total removal cross-section for energy group g' in volume $V_j$, $\Sigma_t^{n,g'}$ is the total removal cross-section for any volume $V_n$ that lies between volumes $V_i$ and $V_j$, and $d_n$ is the distance along the angular vector through volume $V_n$. The sum in eq. (32) is taken over all discrete volumes that lie between volumes $V_i$ and $V_j$.

Substituting eq. (32) into eq. (31) and performing the integration over s and s' yields:

$$T_{i-j,k',g'} = \frac{W_{k'}}{\sum_{i,g'}^t \sum_{j,g'}^t V_i} \int dA [e^{-\tau_{d,g'}}(1-e^{-\tau_{i,g'}})(1-e^{-\tau_{j,g'}})] \tag{33}$$

where:

$$\tau_{i,g'} \equiv \sum_{i,g'}^t d_i \tag{34}$$

$$\tau_{j,g'} \equiv \sum_{j,g'}^t d_j \text{ and} \tag{35}$$

$$\tau_{d,g'} \equiv \sum_n \sum_{n,g'}^t d_n \tag{36}$$

When region I is the same as region j, eq. (31) takes a slightly different form since the integration is performed totally within a single volume. The resulting integral equation for the angular transmission coefficient within a single volume is given by:

$$T_{i-i,k',g'} = \frac{W_{k'}}{V_i} \int dA \int_0^{d_i} \int_0^{s'} e^{-\Sigma_{i,g'}(s'-s)} ds \, ds' \tag{37}$$

Performing the indicated integration over s and s' and noting that $$V_{a=d_1} \int dA \tag{38}$$

results in the following expression for the angular transmission coefficient within a single volume, $V_i$:

$$T_{i-i,k',g'} = \frac{W_{k'}}{\sum_{i,g'}^t} \left[ 1 - \frac{1}{\sum_{i,g'}^t V_i} \int dA(1-e^{-\tau_{i,g'}}) \right] \tag{39}$$

VIII. Two-Dimensional (Planar) Analyses

It is possible to simplify the geometry representation for those problems that have virtually no variation in the axial direction. These problems can be specified using a planar two-dimensional geometric representation that is formed by integrating the axial component over its entire length, thus removing it from the evaluation process. Since reducing the geometric representation to two dimensions often presents substantial savings in computer memory requirements and execution time, it is desirable to utilize two-dimensional evaluations whenever the problem specification permits its use.

In a two-dimensional representation, it is convenient to consider a local coordinate system composed of orthogonal axes (x,y,z). The x-y plane is taken to be perpendicular to the axial direction, and the x-axis is aligned along the projection of the direction vector, $\Omega_{k'}$ onto the x-y plane. With this representation, the spatial derivative. dV, can be expressed in the form:

$$dV = dx \, dy \sin\theta \, d\theta \tag{40}$$

where $\theta$ is the declination of the direction vector, $\Omega_{k'}$ with respect to the vertical (z) axis. The projection of the direction vector onto the x-y plane results in the following representations in terms of the planar coordinates:

$$s = \frac{x}{\sin\theta} \quad \text{and} \tag{41}$$

$$s' = \frac{x'}{\sin\theta} \tag{42}$$

Substituting eqs. (40), (41), and (42) into eq. (29) leads to the following whenever volume $V_i$ is different from volume $V_j$:

$$T_{i-j,k',g'} = \tag{43}$$

$$\frac{W_{k'}}{V_i} \int dy \int_0^{d_j} \int_0^{d_i} \int_0^\pi e^{-\left(\frac{\Sigma_{i,g'} x + \Sigma_{j,g'} x' + \tau_{d,g'}}{\sin\theta}\right)} d\theta\, dx\, dx'$$

where $d_i$ and $d_j$ are the projected distances onto the x-y plane through volumes $V_i$ and $V_j$, respectively, and $\tau_{d,g'}$ is the projected optical path length through all volumes that lie between $V_i$ and $V_j$. The integrations in eq. (43) can be carried out by letting $$u = \frac{1}{\sin\theta} \tag{44}$$

and by noting that symmetry along the z-axis ensures that, $$\int_0^\pi d\theta = 2\int_0^{\frac{\pi}{2}} d\theta \tag{45}$$

Substituting eqs (44) and (45) into eq. (43) leads to the following form for the angular transmission coefficient in planar geometry:

$$T_{i-j,k',g'} = \frac{2W_{k'}}{V_i} \int dy \int_0^{d_j} \int_0^{d_i} \int_1^\infty \frac{e^{-(\Sigma_{i,g'} x + \Sigma_{j,g'} x' + \tau_{d,g'})u}}{u\sqrt{u^2-1}} du\, dx\, dx' \tag{46}$$

Noting that the Bickley-Nayler functions can be expressed in the form:

$$Ki_n(x) = \int_1^\infty \frac{e^{-xu}}{u^n\sqrt{u^2-1}} du \tag{47}$$

and that the integral of these functions takes the form:

$$\int_{x_0}^{x_1} Ki_n(ax)\, dx = \frac{1}{a}[Ki_{n+1}(ax_0) - Ki_{n+1}(ax_1)] \tag{48}$$

allows eq. (46) to be expressed as:

$$T_{i-j,k',g'} = \frac{2W_{k'}}{\Sigma_{i,g'} \Sigma_{j,g'} V_i} \int dy [Ki_3(\tau_{i,g'} + \tau_{j,g'} + \tau_{d,g'}) - \tag{49}$$
$$Ki_3(\tau_{i,g'} + \tau_{d,g}) - Ki_3(\tau_{j,g'} + \tau_{d,g'}) + Ki_3(\tau_{d,g'})]$$

The angular transmission coefficient within the same volume takes the somewhat different form:

$$T_{i-i,k',g'} = \frac{2W_{k'}}{\Sigma_{i,g'}^t} \left[1 - \frac{1}{\Sigma_{i,g'}^t V_i} \int dy [Ki_3(0) - Ki_3(\tau_{i,g'})]\right] \tag{50}$$

IX. Method of Characteristics Solution Methodology

It is possible to directly solve the basic transport equation, eq. (4), without the necessity of developing an integral form of the equation, as is needed for a collision probability solution methodology. This procedure, known as the "method of characteristics" technique, has the advantage that the implementation is relatively straightforward for either 2-dimensional or 3-dimensional applications. In addition, the solution methodology does not require the formation and subsequent solution of a prohibitively large coupled matrix equation. As a result, the methodology is particularly well suited to problems that require a large number of solution regions, such as those that generally evolve from standard ex-core applications.

Since the method of characteristics methodology does not involve the solution of a highly coupled set of region equations, the method may require additional solution iterations, relative to a collision probability solution, if a "good" initial guess of the angular flux distribution is not available. For the solution of practical problems, this inefficiency is more than made up for by a substantial reduction in memory and disk storage requirements. In addition, it is possible to obtain substantial savings from flux profiles obtained from previous evaluations, provided the general geometry does not change (as is almost always the case in practical applications).

X. Three-Dimensional Method of Characteristics Methodology

The Method of Characteristics methodology consists of performing a direct integration of the basic transport equation presented in eq. (4) along the characteristic direction denoted by the variable s. If this characteristic direction is represented by the angular direction $\Omega_k$, and if the material cross-sections and source term are constant within an arbitrary volume, $V_i$, then eq. (4) can be expressed in discretized form as:

$$\frac{d\Phi_{i,k,g}}{ds} + \sum_{i,k,g} \Phi_{i,k,g} = \hat{q}_{i,k,g} \tag{51}$$

where $$\sum_{i,k,g} \equiv \sum_{i,g}^t - W_k \sum_{i,k-k,g-g}^s \quad \text{and} \tag{52}$$

$$\hat{q}_{i,k,g} \equiv Q_{i,k,g} + \sum_{g'=1}^G \sum_{k'=1}^K W_{k'} \sum_{\substack{i,k'-k,g'-g \\ g',k'=g,k}}^s \Phi_{i,k',g'} \tag{53}$$

If all of the angular flux values in the scattering component of eq. (53) are assumed to be constant for the time being (the validity of this assumption is based upon the order in which the angular fluxes are solved, as will be discussed later), then the solution to eq. (51) can be expressed as:

$$\Phi_{i,k,g}(s) = \left(\Phi^I_{i,k,g} - \frac{\hat{q}_{i,k,g}}{\Sigma_{i,k,g}}\right) e^{-\Sigma_{i,k,g} s} + \frac{\hat{q}_{i,k,g}}{\Sigma_{i,k,g}} \quad (54)$$

where s is measured from the entrant boundary of volume $V_i$ and $\Phi^I_{i,k,g}$ is the value of the angular flux at the entrant boundary.

The average angular flux within volume $V_i$ is given by:

$$\overline{\Phi}_{i,k,g} = \frac{1}{d_i} \int_0^{d_i} \Phi_{i,k,g}(s) \, ds \quad (55)$$

Substituting eq. (53) into eq. (55) results in the following expression for the average angular flux along ray $\Omega_k$:

$$\overline{\Phi}_{i,k,g} = \frac{\Phi^I_{i,k,g} - \frac{\hat{q}_{i,k,g}}{\Sigma_{i,k,g}}}{\tau_{i,k,g}} (1 - e^{-\tau_{i,k,g}}) + \frac{\hat{q}_{i,k,g}}{\Sigma_{i,k,g}} \quad (56)$$

where $\tau_{i,k,g}$ is the mean free path through volume $V_i$ for a particle traveling in the $\Omega_k$ direction in energy group g and is given by:

$$\tau_{i,k,g} = \Sigma_{i,k,g} \, d_i \quad (57)$$

Now consider the situation wherein more than one parallel ray traverses volume $V_i$ in the $\Omega_k$ direction. The total average angular flux in volume $V_i$ in the $\Omega_k$ direction in energy group g can be expressed as the volume weighted contribution of the incremental average flux values from each ray, such that $$\Phi_{i,k,g} = \frac{\sum_{r=1}^{R} \Phi^{(r)}_{i,k,g} \Delta V_r}{\sum_{r=1}^{R} \Delta V_r} \quad (58)$$

where the index r denotes an individual parallel ray that traverses volume $V_i$, R is the total number of parallel rays through volume $V_i$, and the differential volume subtended by ray r as it traverses the volume, denoted by $\Delta V_r$, is given by $$\Delta V_r = d_i^{(r)} \Delta A_r \quad (59)$$

where $d_i^{(r)}$ is the distance through volume $V_i$ along ray r, and $\Delta A_r$ is the cross-sectional area subtended by ray r.

The value of the angular flux at the exit boundary of volume $V_i$, denoted by $\Phi^O_{i,k,g}$, can also be determined from eq. (53) to be:

$$\Phi^O_{i,k,g} = \left(\Phi^I_{i,k,g} - \frac{\hat{q}_{i,k,g}}{\Sigma_{i,k,g}}\right) e^{-\tau_{i,k,g}} + \frac{\hat{q}_{i,k,g}}{\Sigma_{i,k,g}} \quad (60)$$

Note that this value is also the value of the angular flux at the entrant boundary of the volume adjacent to volume $V_i$ along a given ray.

After the particle transport analysis program 31 executes in accordance with the foregoing discussion, particle distribution data 38, such as radiation dose rate data 40 is generated. Examples of radiation dose rate data 40 follows. The following data is based upon the power plant described above in Table 1. Two state point conditions for the power plant were evaluated. The first state point corresponds to a cycle core average exposure of 0.322 GWd/MT and the second state point corresponds to a core average exposure of 0.55 Gwd/MT. The plots of FIG. 13 includes the results of both state points. This allows a visual comparison of the differences in dose rate distributions as influenced by the different power levels and power shapes of the reactor core region at the different core exposures and operating state conditions of the power station.

Figure 13:
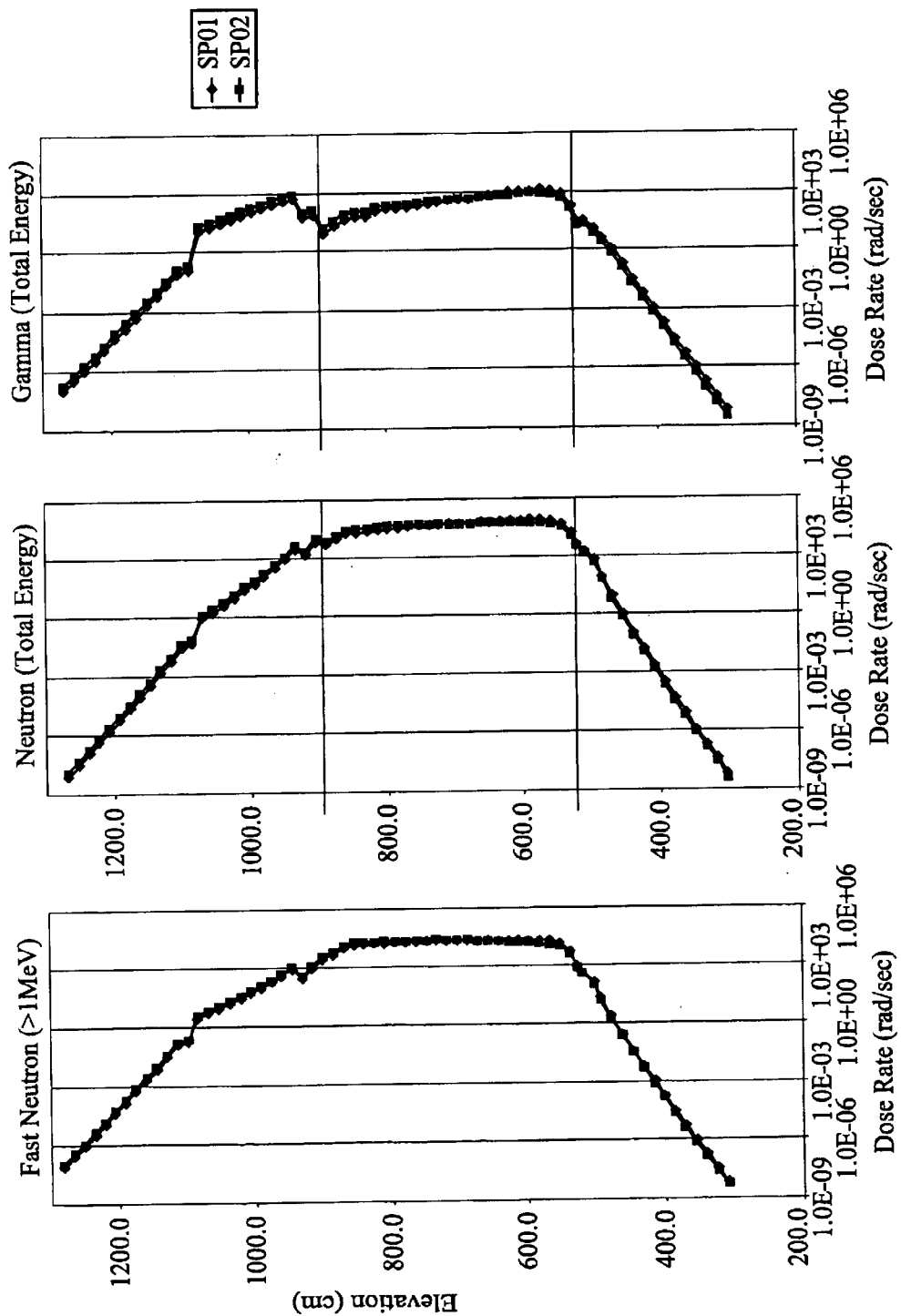
FIG. 13 illustrates axial does rates through the center of a reactor assembly, as calculated in accordance with an embodiment of the invention.
Figure 14:
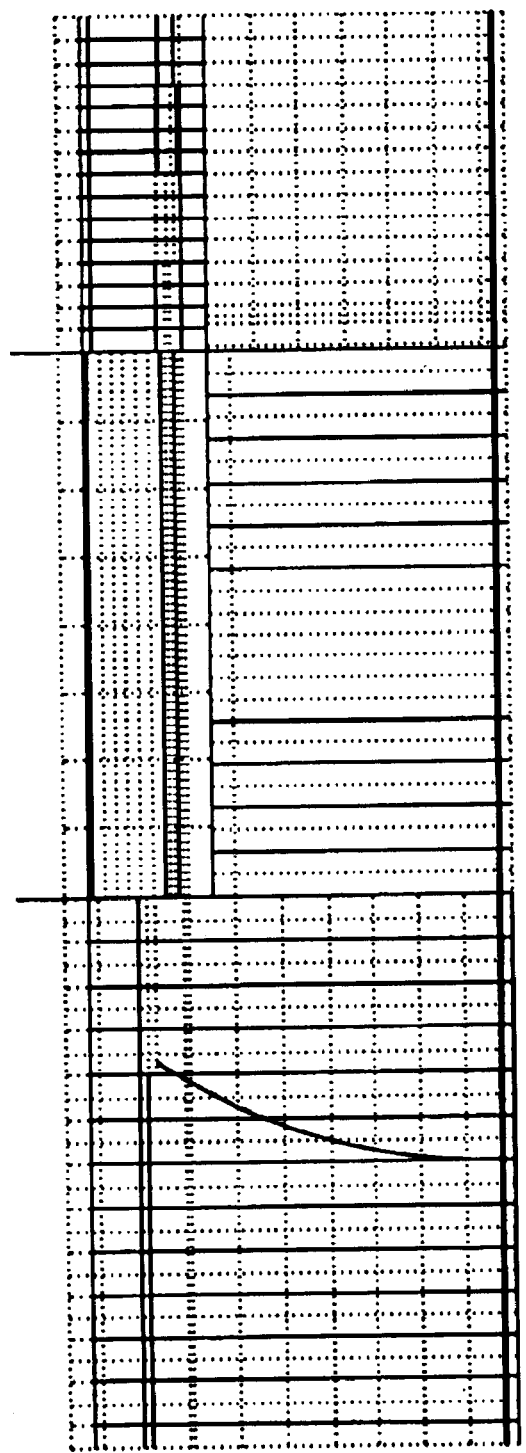
FIG. 14 illustrates an axial cutaway of the basic geometry modeled in FIG. 13.

FIG. 13 illustrates the axial distribution of fast neutron, total neutron and total gamma-ray does rates through the center of the reactor 50. FIG. 14 illustrates an axial cutaway of the basic geometry model. The darker line which passes through the figure shows the regions from which the dose rate data was edited.

FIG. 13 shows the fundamental power shape differences between the two state points. It is observed that the core average power for both state points is very similar, although state point 2 shows a slightly higher power in the top of the core. Thus, it is expected that the axial and radial profiles for other regions will be similar. Interestingly, the figures show that the model captured the large flux gradients above and below the active fuel planes where high concentrations of structural materials for the top guide, shroud head and core support regions exist.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A method executed by a computer under the control of a program, said computer including a memory for storing said program, said method comprising the steps of:

establishing a three-dimensional geometric representation of an object;

projecting a set of rays through said three-dimensional geometric representation to produce simulated anisotropic particle scattering; and executing a particle transport analysis on said simulated anisotropic particle scattering to produce particle transport data.

2. The method of claim 1 wherein said executing step includes the step of executing a particle transport analysis on said simulated anisotropic particle scattering to produce particle transport data including particle interaction probabilities as a function of energy groupings.

3. The method of claim 1 wherein said executing step includes the step of executing a particle transport analysis that preserves angular characteristics of particle interactions.

4. The method of claim 1 wherein said executing step includes executing a particle transport analysis that preserves non-linear anisotropic scattering particle interactions.

5. The method of claim 1 wherein said executing step includes executing a particle transport analysis that preserves angle-dependent particle production rates.

6. The method of claim 1 wherein said executing step includes executing a particle transport analysis that produces particle transport data including particle collision data, reaction rate data, and energy deposition data.

7. The method of claim 1 wherein said executing step includes executing a particle transport analysis that produces particle transport characteristics, particle concentrations, and particle interaction rates.

8. The method of claim 1 wherein said establishing step includes the step of establishing three-dimensional geometric representation with a computer aided design system.

9. The method of claim 8 wherein said projecting step includes the step of projecting said set of rays with a line-of-sight analysis feature of said computer aided design system.

10. The method of claim 9 wherein said projecting step includes the step of rotating said set of rays through a set of directions to characterize angular dependence of particle motion.

11. The method of claim 1 wherein said establishing step includes the step of establishing a three-dimensional geometric representation including material specifications characterizing components of said three-dimensional geometric representation.

12. A computer readable memory to direct a computer to function in a specified manner, comprising:
   a computer aided design program to establish a three-dimensional geometric representation of an object, said computer aided design program including a line-of-sight analysis feature to project a set of rays through said three-dimensional geometric representation to produce simulated anisotropic particle scattering; and
   a particle transport analysis program to execute a particle transport analysis on said simulated anisotropic particle scattering to produce particle transport data.

13. The computer readable memory of claim 12 wherein said particle transport analysis program includes instructions to execute an integral a particle transport analysis on said anisotropic particle scattering to produce particle transport data including particle interaction probabilities as a function of energy groupings.

14. The computer readable memory of claim 12 wherein said particle transport analysis program includes instructions to execute a particle transport analysis that preserves angular characteristics of particle interactions.

15. The computer readable memory of claim 12 wherein said particle transport analysis program includes instructions to execute a particle transport analysis that preserves non-linear anisotropic particle scattering interactions.

16. The computer readable memory of claim 12 wherein said particle transport analysis program includes instructions to execute a particle transport analysis that preserves angle-dependent particle production rates.

17. The computer readable memory of claim 12 wherein said particle transport analysis program includes instructions to execute a particle transport analysis that produces particle transport data including particle collision data, reaction rate data, and energy deposition data.

18. The computer readable memory of claim 12 wherein said particle transport analysis program includes instructions to execute a particle transport analysis that produces particle transport data including particle transport characteristics, particle concentrations, and particle interaction rates.

19. The computer readable memory of claim 12 wherein said computer aided design program includes instructions to rotate said set of rays through a set of directions to characterize angular dependence of particle motion.

20. The computer readable memory of claim 12 wherein said computer aided design program stores material specifications characterizing components of said three-dimensional geometric representation.

* * * * *

UNITED STATES PATENT AND TRADEMARK OFFICE
CERTIFICATE OF CORRECTION

PATENT NO. : 6,795,801 B1
DATED : September 21, 2004
INVENTOR(S) : Kenneth E. Watkins, Dean B. Jones and Kathleen S. Ramp It is certified that error appears in the above-identified patent and that said Letters Patent is hereby corrected as shown below:

Column 22,
Line 3, delete "an integral".

Signed and Sealed this

Twenty-third Day of November, 2004

JON W. DUDAS
*Director of the United States Patent and Trademark Office*